(12) United States Patent
Moffa

(10) Patent No.: US 8,347,236 B1
(45) Date of Patent: Jan. 1, 2013

(54) CLIENT SERVER INTERFACE FOR A KNOWLEDGE MANAGEMENT SYSTEM

(75) Inventor: Jeffrey A. Moffa, Northville, MI (US)

(73) Assignee: Emergent Systems Corporation, Dearborn, MI (US)

( * ) Notice: Subject to any disclaimer, the term of this patent is extended or adjusted under 35 U.S.C. 154(b) by 331 days.

(21) Appl. No.: 12/711,826

(22) Filed: Feb. 24, 2010

Related U.S. Application Data

(60) Provisional application No. 61/154,805, filed on Feb. 24, 2009.

(51) Int. Cl.
*G06F 3/14* (2006.01)
*G06F 3/17* (2006.01)

(52) U.S. Cl. .......... 715/849; 715/848; 700/97; 700/182; 703/1; 703/2

(58) Field of Classification Search .......... 715/200–277, 715/700–867; 700/97, 182, 701–866; 709/201–229; 705/50–79; 345/30–111; 703/1, 2
See application file for complete search history.

(56) References Cited

U.S. PATENT DOCUMENTS

| | | | |
|---|---|---|---|
| 5,355,445 A | 10/1994 | Shibao et al. | |
| 5,809,493 A | 9/1998 | Ahamed et al. | |
| 6,353,767 B1 | 3/2002 | Wakeman et al. | |
| 6,393,331 B1 * | 5/2002 | Chetta et al. | 700/97 |
| 7,058,472 B2 * | 6/2006 | Mathews et al. | 700/182 |
| 7,158,923 B1 | 1/2007 | Murthy et al. | |
| 7,937,251 B2 * | 5/2011 | Turner et al. | 703/2 |
| 2005/0071135 A1 | 3/2005 | Vredenburgh et al. | |
| 2005/0091191 A1 | 4/2005 | Miller et al. | |
| 2005/0203718 A1 * | 9/2005 | Carek et al. | 703/1 |
| 2006/0025983 A1 | 2/2006 | Arbitter et al. | |

* cited by examiner

*Primary Examiner* — Ruay Ho
(74) *Attorney, Agent, or Firm* — Young Basile Hanlon & MacFarlane P.C.

(57) ABSTRACT

An interface method for a knowledge management system server. The method includes receiving a symbolic identification of an object classification from a first user system, retrieving a definition of the object classification from a database, and retrieving one or more data elements that are included within the definition of the object classification from the database. The data elements include one or more input parameters, and an initial list of the input parameters is transmitted to the first user system. The method further includes receiving object parameters from the first user system, and transmitting an updated list of the input parameters in response to a change in the input parameters caused by at least one of a change to the definition of the object classification, a change to one or more of the data elements, or receipt of the object parameters from the first user system.

7 Claims, 5 Drawing Sheets

CLIENT SERVER INTERFACE FOR A KNOWLEDGE MANAGEMENT SYSTEM

CROSS-REFERENCE TO RELATED APPLICATIONS

This application claims the benefit of U.S. Provisional Patent Application No. 61/154,805, filed on Feb. 24, 2009.

FIELD OF THE INVENTION

The present invention relates to the field of knowledge management systems, and more particularly, to a client server interface for a knowledge management system.

BACKGROUND OF THE INVENTION

Although varied in scope and implementation, knowledge management systems generally intend to distribute knowledge across an organization, by identifying and codifying knowledge, and/or by identifying and connecting the persons who are most knowledgeable about particular subjects. In particular, knowledge management systems are typically computer implemented, database driven systems that store discrete elements of knowledge in a computer interpretable format so that the organization's knowledge can be refined and disseminated into various contexts as need arises. Typically, knowledge management systems provide decision support to the end-user who requires the expertise of others. In engineering contexts, this decision support may take the form of assisting in certain aspects of product design and manufacturing process design.

By way of example, the field of knowledge-based engineering (KBE) integrates knowledge management systems with computer-aided design (CAD) and computer-aided engineering (CAE) systems. For example, knowledge that is codified in the knowledge management system may be applied to a three-dimensional model of a product to dynamically apply or change parameters that are utilized to define or alter aspects of the three-dimensional product model in the CAD system.

In previous knowledge management systems, it is typical for a task to be analyzed or controlled by a knowledge management system according to a predefined template that is developed to work with a specific software package. Such templates have rules encoded therein that establish the parameters that must be supplied by the user to allow processing by the knowledge management system. In other words, the software package used must be provided, in advance, with knowledge regarding the processing that will be performed by the knowledge management system. For example, if a CAD system that is being used to design a product and a knowledge management system is validating the product design to ensure compliance with design standards, the template used by the CAD system is typically structured in advance to collect data necessary to perform the desired validation testing, and changes to the tests performed could require revision of the template. Thus, these systems are inflexible, as the templates must be updated to allow changes to the desired validation testing or other activity performed by the rule service. Accordingly, need exists for improvement in the manner in which rule services interface with client systems in knowledge management systems.

SUMMARY OF THE INVENTION

The invention provides an interface method for a knowledge management system server. The method includes the steps of receiving a symbolic identification of an object classification from a first user system, and retrieving a definition of the object classification from a database. The object classification describes an object on the first user system, and the definition of the objection classification describes a collection of one or more data elements that have substantive technical data encoded therein. The method further includes the steps of retrieving the data elements that are included within the definition of the object classification from the database, the data elements including one or more input parameters, and transmitting an initial list of the input parameters to the first user system subsequent to the step of retrieving the data elements. The method additionally includes the steps of receiving object parameters from the first user system subsequent to transmission of the initial list of input parameters, the object parameters further describing the object, and transmitting an updated list of the input parameters in response to a change in the input parameters caused by at least one of a change to the definition of the object classification, a change to one or more of the data elements, or receipt of the object parameters from the first user system.

The method may additionally include the steps of associating an evaluation procedure with the object classification, determining whether the object parameters include all of a set of required input parameters for the evaluation procedure, and performing the evaluation procedure using the object parameters if the object parameters include all of the required input parameters, and transmitting a result to the first user system. Furthermore, the method may include transmitting a list of unsatisfied input parameters to the first user system if the object parameters do not include all of the required input parameters.

In methods that include the step of performing the evaluation procedure, the method may further include the step of re-performing the evaluation procedure in response to the change in the input parameters caused by at least one of a change to the definition of the object classification, the change to one or more of the data elements, or receipt of the object parameters from the first user system and transmitting an updated result to the first user system.

The evaluation procedure may include one or more rules for evaluating the object using the input parameters. The rules for evaluating the object include a comparison of the input parameters to a design standard that corresponds to the object.

The method may additionally include the steps of receiving updated object parameters from the first user system subsequent to the step of transmitting an updated list of the input parameters, and re-performing the evaluation procedure for the object upon receiving the updated object parameters from the first user system.

The result of the evaluation procedure may by a qualitative score for the object. Alternatively, the result may include at least one of an acceptable condition indicator or an unacceptable condition indicator. As another alternative, the method may include displaying a three-dimensional representation of the object on the first user system, wherein at least a portion of the object is color-coded in accordance with the result.

The method may further include the step of modifying one or more of the data elements in response to instructions from a second user system subsequent to the step of receiving object parameters from the first user system and prior to the step of transmitting an updated list of the input parameters. In addition or alternatively, the method may further include the step of modifying the definition of the object classification in response to instructions from a second user system subsequent to the step of receiving object parameters from the first user system and prior to the step of transmitting an updated list of the input parameters.

The object may be an article of manufacture. The object parameters may include structural details of the object.

BRIEF DESCRIPTION OF THE DRAWINGS

The description herein makes reference to the accompanying drawings, wherein like-referenced numerals refer to like parts throughout several views and wherein.

DETAILED DESCRIPTION OF THE PREFERRED EMBODIMENT

Figure 1:
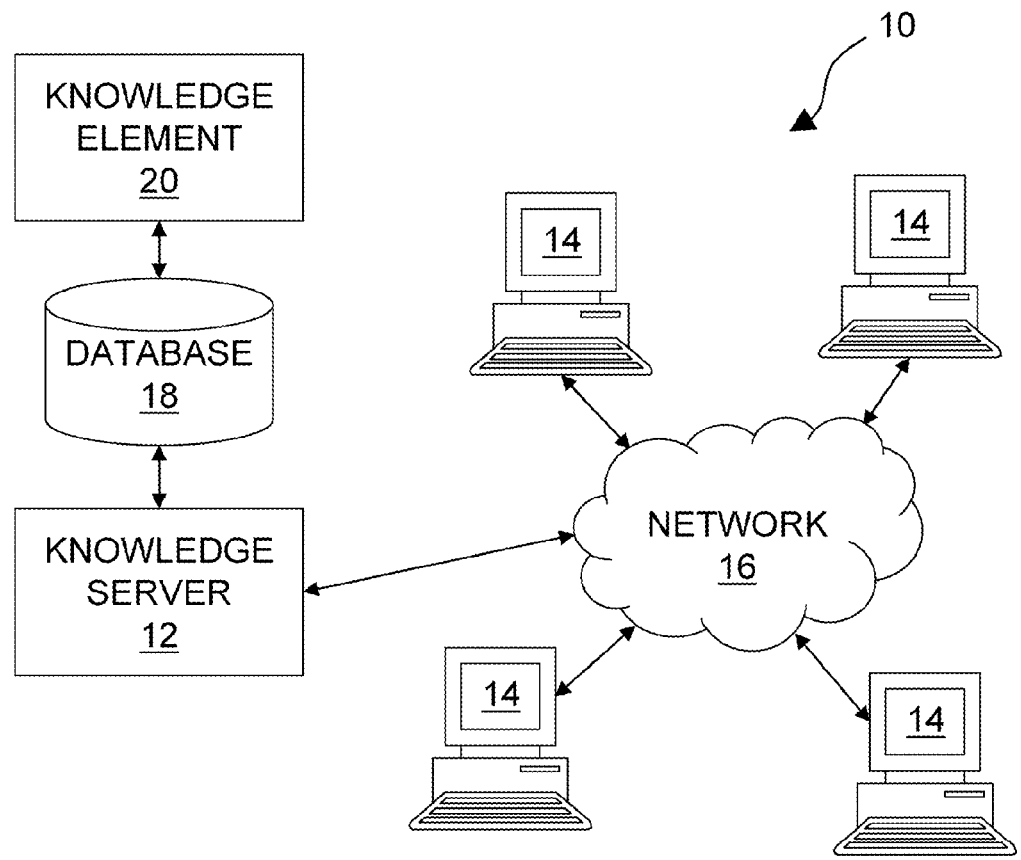
FIG. 1 is a block diagram showing a knowledge management system according to the present invention.
Figure 2:
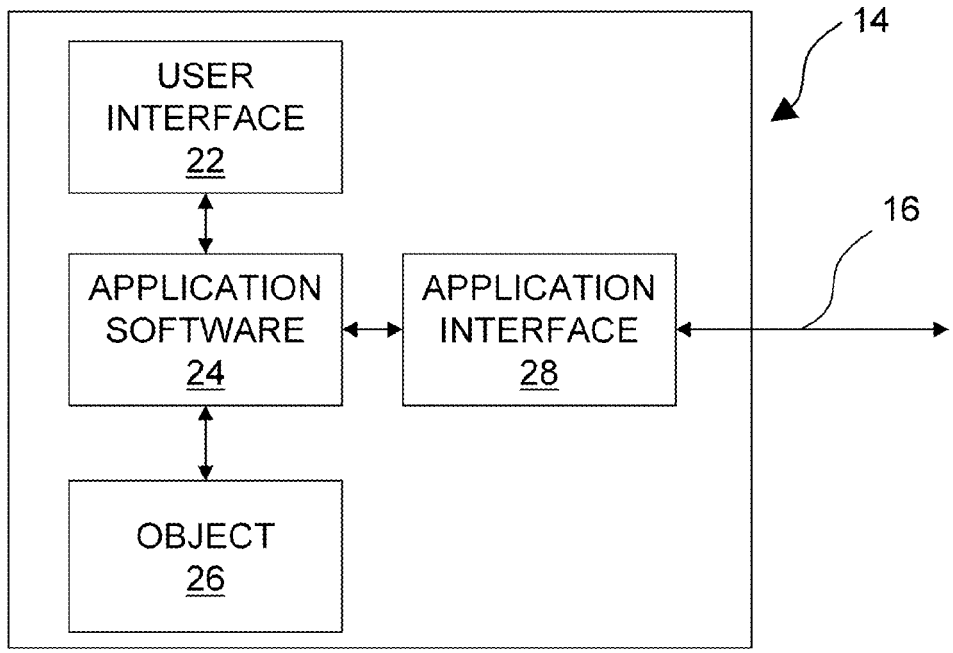
FIG. 2 is a block diagram showing a user system according to the present invention.

Referring to the drawings, the present invention will now be described in detail with reference to the disclosed embodiment.

As shown in FIG. 1, the invention provides a knowledge management system 10 that includes a knowledge server 12 and a plurality of distributed user workstations 14. The knowledge server 12 and the user workstations 14 each include one or more computers that are configured according to the invention, for example, by provision of appropriate software. The knowledge server 12 and user workstation 14 are in communication with one another, for example, using a communications network 16, such as the internet, a local area network, or an analogous system for interconnecting remote computers for data transmission therebetween. To allow for storage and retrieval of data, the knowledge server 12 includes or is operatively connected to a database 18.

The knowledge server 12 provides a means for codifying the know-how of an expert into a computer interpretable form such as a knowledge element 20, which is also referred to herein as a data element. The knowledge server 12 receives the knowledge elements 20 from the user workstation 14 and stores the knowledge elements 20 in the database 18 for future use by the user workstation 14. The knowledge elements 20 may be modified at any time by any of the user workstations 14, and modifications to the knowledge elements 20 will be immediately accessible and usable by all of the other user workstations 14.

Each knowledge element 20 may include several different types of data, such as substantive data and bibliographic data, which is structured so as to be computer interpretable. Each knowledge element 20 may be stored as fields in a database table in the database 18 or in a structured document format such as XML, or in any other suitable fashion. The knowledge elements 20 include, as the principal component thereof, technical data that represents the know-how that is encoded within the knowledge element 20. The technical data encoded in the knowledge element 20 may include parametric relationships, attributes, conditional relationships between values, mathematic expressions, or similar types of information. The technical data encoded in some of the knowledge elements 20 comprises a rule or a set of rules that may be utilized to evaluate one or more input values and return one or more output values, where the input values and output values could be values, conditions, expressions, etc. Furthermore, the technical data encoded in the knowledge elements 20 could describe a complex relationship between an input value and an output value that combines two or more of the previously mentioned classes of technical data. In this manner, a number of knowledge elements 20 may be programmatically interrelated, interpreted, and applied by the knowledge server 12 and the user workstation 14 for utilization in conjunction with automated problem solving or design applications, as will be explained in greater detail herein.

The user workstation 14 is a conventional computer that is provided with software that allows the user workstation to perform the functions described herein. To allow the user workstation 14 to receive information from a user and present information to a user, the user workstation 14 includes a user interface 22, which may include standard input/output devices, such as a monitor and keyboard.

The user workstation 14 is configured to communicate with the knowledge server 12 over the network 16 to allow direct viewing, creation, and modification of the knowledge elements 20, for example, using a web-based software application. The user workstation 14 is also configured to communicate with the knowledge server 12 for transmission of data to and from application software 24.

In order to automate certain tasks during use of the application software 24, the user workstation 14 includes an application interface 28. The application interface 28 is a software layer, such as a plug-in, that communicates with the application software 24 to facilitate communication between the application software 24 and the knowledge server 12. In particular, and as will be explained in further detail herein, the application interface 28 may be configured to utilize the application software 24 to read parameters from the application software and write parameters to the application software 24.

In an exemplary embodiment, the application software 24 is computer-aided design software that is operable to allow the user to create and modify an object 26 that comprises data corresponding to a physical structure. For example, the object 26 may be data describing a two-dimensional or three-dimensional representation of a design for a product, manufacturing process, or other structure. Thus, using the user interface 22, the user is able to create and control parameters describing the object 26 using the application software 24.

Figure 3:
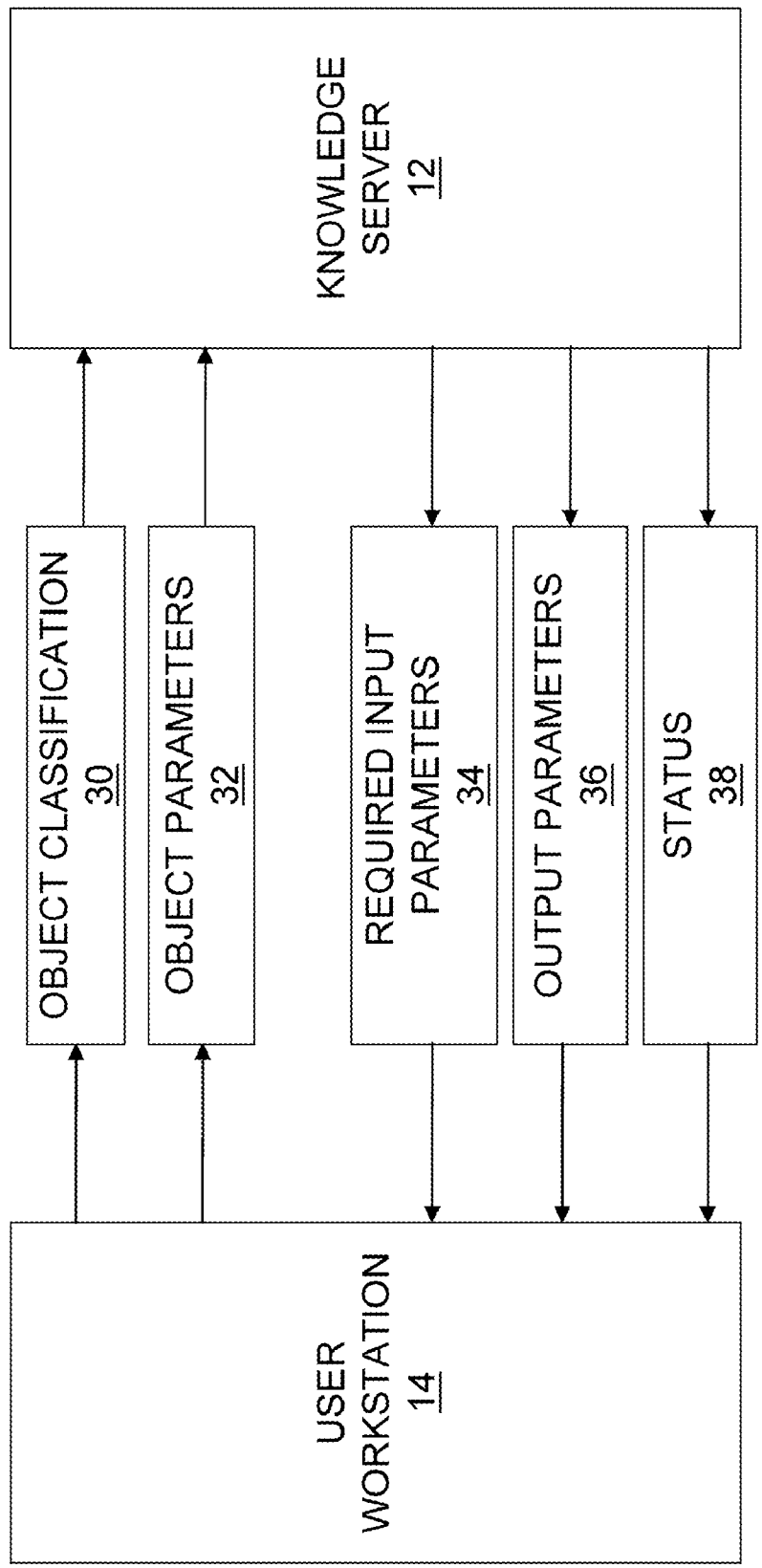
FIG. 3 is an illustration showing communications between a user workstation and a knowledge server of the knowledge management system according to the present invention.

The knowledge server 12 is configured to evaluate aspects of the object 26 and provide a result to the user workstation 14. For example, the knowledge server 12 may evaluate conformance of the object 26 with respect to one or more design standards. To do so, the user workstation 14 interfaces with the knowledge server 12 in an iterative manner, as shown in FIG. 3. During this process, the user workstation 14 is configured to transmit an object classification 30 as well as object parameters 32 to the knowledge server 12.

The object classification 30 is a high-level description of what the object 26 represents. For example, in the context of automotive design, representative object classifications 30 may include hood, fender, headrest, and trim panel. Selection of the object classification 30 at the user workstation 14 is symbolic in nature; the user workstation 14 need not be aware of any information other than the name of the object classification 30 in order to select and use it, as those details will be provided on an as-needed basis by the knowledge server 12. Additionally, the object classification 30 is the only information that need be initially provided to the knowledge server 12 by the user workstation 14, since the object 26 may initially lack object parameters 32 that describe it. The result is that the user workstation 14 and the user need not be aware of the object parameters 32 that are necessary to describe the object 26, and thus, the application software 24 and application interface 28 require no manner of pre-programming that is specific to a particular object 26.

The object parameters 32 represent aspects of the object 26, typically represented in the form of a parameter name and a parameter value. The object parameters 32 include parameters that are specifically requested by the knowledge server 12, as will be described herein, as well as parameters that are not requested by the knowledge server 12 but which nonetheless describe aspects of the object 26. The object parameters 32 may be dynamically linked to aspects of the object 26 using the application software 24. For example, if the object parameter 32 is a radius, the user may select the structure of the object 26 that is to be described by the object parameter 32 and link the object parameter 32 to the structure of the object 26. Furthermore, object parameters 32 may be instanced, such that multiple portions of the object 26 may be described by corresponding instances of a particular object parameter 32, and those instances of that object parameter 32 may be added and subtracted from the object 26 at will. For instance, where the object 26 is a plastic panel, the object classification 30 may indicate that the height of a rib formed on the panel is relevant as an object parameter 32 describing the rib height. However, in a case where the object has multiple ribs, the user may create an instance of the rib height object parameter 32 for each of the ribs.

In response to a communication from the user workstation 14, the knowledge server 12 responds to the user workstation 14 based on the object classification 30, as well as the object parameters 32, if any are provided by the user workstation 14. Based on the object classification 30, the knowledge server 12 is configured to retrieve one or more knowledge elements 20 from the database 18. Generally speaking, the database 18 includes a definition of the object classification 30, which describes a collection of one or more knowledge elements 20. In particular, the object classification 30 may itself be one of the knowledge elements 20, which comprises a static list of knowledge elements 20 that are germane to the object 26, or a dynamic query that is processed by the knowledge server 12 and returns a list of one or more of the knowledge elements 20. This definition of the object classification 30 is dynamic in nature, and can be changed at any time by any of the user workstations 14, which would cause a change, in real time, in the set of the knowledge elements 20 that are germane to a particular object 26 that is associated with that object classification 30 and is being manipulated by a different one of the user workstations 14.

As an alternative to initially providing the object classification 30 to the knowledge server 12, the user workstation 14 could initially transmit only the object parameters 32 to the knowledge server 12 in lieu on the object classification 30. In this case, the object parameters 32 would serve as a sort of implicit selection of the object classification 30, given that the provided object parameters 32 would likely exclude at least some of the possible object classifications 30 that could be explicitly selected, allowing the knowledge server 12 to proceed as if the object classification 30 had been explicitly defined. In such a case, the response provided to the user workstation 14 by the knowledge server 12 could include those knowledge elements 20 that would be common to all of the possible object classifications 30.

In a typical case, one or more of the knowledge elements 20 corresponding to the object classification 30 define expressions that are to be evaluated by the knowledge server 12. Each of the tests specified by a knowledge element typically requires one or more required input parameters 34 that must be provided to the knowledge server 12 by the user workstation 14 as object parameters in order to allow the specified tests to be performed. Once the required input parameters 34 have been determined for a particular evaluation that is invoked by the object classification 30, the knowledge server 12 evaluates whether the object parameters 32 provided by the user workstation 14 include all of the required input parameters 34 for that particular evaluation. If so, the knowledge server 12 evaluates the expression and provides results therefrom to the user workstation 14 as output parameters 36. The output parameters 36 can include the final results of calculations performed in the course of the evaluation that was invoked by the object classification 30, as well as the results of intermediate calculations performed in the course of the evaluation. Of course, where multiple instances of the input parameters 34 are provided, corresponding instances of the output parameters 36 may be provide in correspondence thereto.

By way of example, the output parameters 36 could include a qualitative score representing the result of evaluations performed with respect to the object 26 by the knowledge server 12 in light of the object classification 30. Furthermore, the qualitative score could be represented by a condition, such as "pass" or "fail" and could be accompanied by a coloration scheme, wherein portions or aspects of the object 26 could be displayed on the user interface 22 by the application software 24 in a color coded manner. For example, the output parameters 36 may designate that a portion of the object 26 be displayed as green where an aspect of that portion of the object 26 has been evaluated as acceptable by the knowledge server 12, or could be displayed as red where that aspect of that portion of the object 26 has been evaluated as unacceptable by the knowledge server 12. Of course, other colors could be used, and numerous states or conditions could be represented in this manner. Furthermore, any portion of the object 26 could be described by numerous output parameters 36, for example, describing multiple qualitative scores corresponding to multiple aspects of that object.

The knowledge server 12 may additionally provide a status indication 38 to the user workstation 14 indicating the status of a test that is to be performed according to the object classification 30. For example, the status indication 38 may state that the test has been performed successfully. If the object parameters 32 do not include all of the required input parameters 34, the status indication 38 can be used by the knowledge server 12 to inform the user workstation 14 that some of the required input parameters 34 have not been described by the object parameters 32, and thus, the condition has not been evaluated. The status indication 38 can also be used by the knowledge server 12 to report disconformities to the user, such as when the supplied object parameters 32 are out of bounds, or cause the evaluation to be over-constrained, such that a result cannot be determined. In such a case, the status indication 38 could provide information in the form of help messages that are encoded in the knowledge elements 20 to assist the user in rectifying any disconformities. Finally, the status indication 38 could provide information to the user regarding the tests described by the object classification 30, along with links to any relevant knowledge elements 20, so that the underlying knowledge elements could be reviewed by the user.

Figure 4:
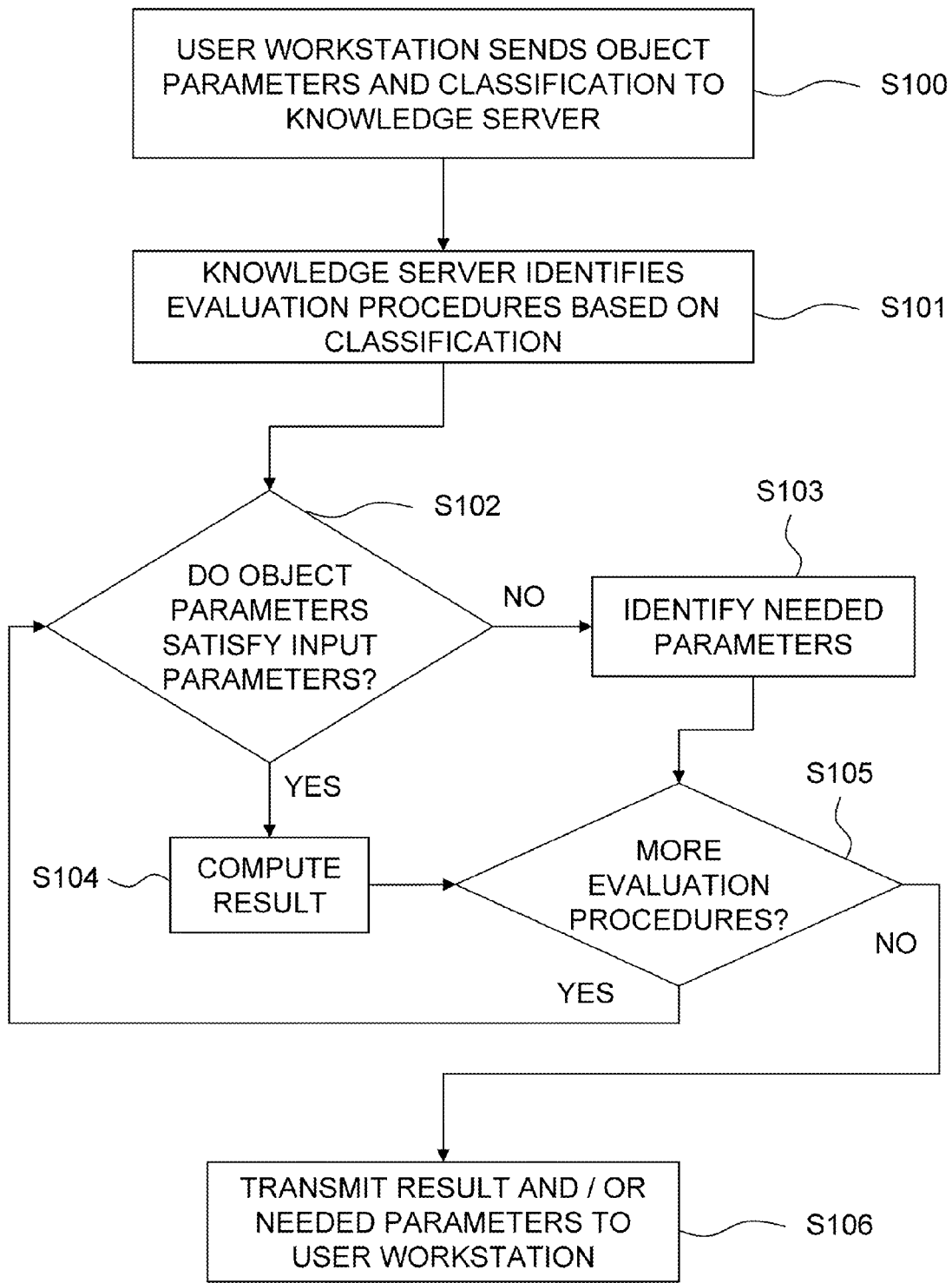
FIG. 4 is a flowchart explaining operation of the knowledge management system according to the invention.

The course of communications between the knowledge server 12 and the user workstation 14 will be better understood with reference to FIG. 4. In Step S100, the user workstation 14 sends the object classification 30 and the object parameters 32, if any are currently defined for the object 26, to the knowledge server 12. The process proceeds to Step S101, where the knowledge server 12 identifies all of the evaluation procedures that are to be performed based on the object classification 30. Then, in Step S102, for a particular evaluation procedure, the knowledge server 12 determines whether the object parameters 32 satisfy the required input parameters 34 for the evaluation procedure. If the object parameters 32 do not describe the required input parameters 34, the process proceeds to Step S103, where the parameters required for evaluation but not described by the object parameters 32 are designated as required input parameters 34 for later transmission to the user workstation 14. If, in Step S102, the object parameters 32 satisfy the required input parameters 34 necessary for the evaluation procedure in question, the process proceeds to Step S104, where the result is computed to provide the output parameters 36. Both Steps S103 and S104 proceed to Step S105. In Step S105, the process returns to Step S102 if more evaluation procedures remain for analysis. If no more evaluation procedures remain, the process proceeds from Step S105 to Step S106, where the required input parameters 34, the output parameters 36, and the status indication 38 are transmitted to the user workstation 14 by the knowledge server 12.

The procedure explained with reference to FIG. 4 is performed in an iterative fashion. In particular, the user workstation 14 transmits the object classification 30 and the object parameters 32 to the knowledge server 12 repeatedly and in a predetermined fashion. For example, the user workstation 14 may transmit the object classification 30 and the object parameters 32 to a knowledge server 12 at predetermined intervals of time in response to a command to do so by a user whenever the object 26 is opened for editing by the application software 24, any time the object classification 30 or the object parameters 32 are modified, or in any other desired fashion. In response to receipt of the object classification 30 and the object parameters 32 from the user workstation 14, the knowledge server 12 evaluates the object parameters 32 in light of the object classification 30 and provides results to the user workstation 14 in the form of the required input parameters 34, the output parameters 36, and the status indication 38. Thus, when a new object 26 is created by the user of the user workstation 14 by way of the application software 24, the object 26 initially may contain no object parameters 32. The user then specifies an object classification 30. At that time, the object classification 30 may be transmitted from the user workstation 14 to the knowledge server 12. In response to receipt of the object classification 30, the knowledge server 12 may then identify required input parameters 34 that are germane to the object classification 30, and those input parameters 34 are communicated to the user workstation 14. It will be appreciated that provision of the required input parameters 34 to the user workstation 14 provides guidance to the user, such that the user may then dictate the structural features of the object 26 that correspond to the required input parameters 34. Furthermore, the required input parameters 34 may include information to assist the user in determining the appropriate values for the object parameters 32 that correspond to the required input parameters 34, such as a list of ideal values or a range of possible values. For example, if the required input parameter 34 is material type, the required input parameter 34 may also communicate a list of possible materials, such as aluminum, steel, and fiberglass. After the user adds object parameters 32 to the object 26, the object parameters 32 may be reevaluated by the knowledge server 12, at which time additional evaluation procedures could be identified in light of the values corresponding to the object parameters 32.

Figure 5A:
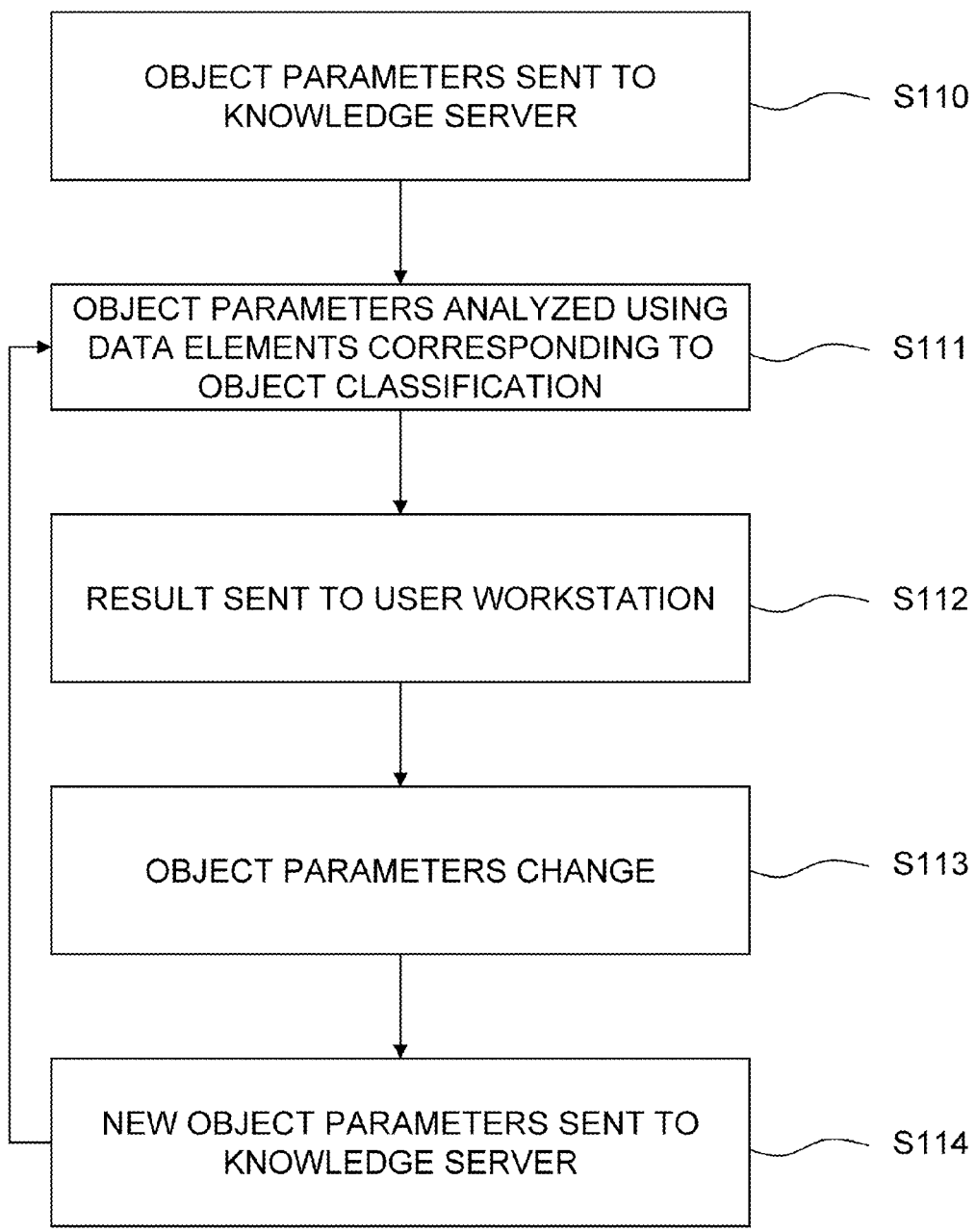
FIG. 5A is a flowchart explaining iterative operation of the knowledge management system in response to a change in object parameters.

The iterative nature of this process will be better understood with reference to FIG. 5A. In Step S110, the object parameters 32 are sent to the knowledge server 12. Subsequently, in Step S111, the object parameters 32 are analyzed in light of knowledge elements 20 corresponding to the object classification 30. The results are then sent to the user workstation 14 in the form of required input parameters 34, output parameters 36, and the status indication 38 in Step S112. The process then proceeds to Step S113, wherein one or more of the object parameters 32 are modified, added, or deleted by the user at the user workstation 14. The updated object parameters 32 are then sent to the knowledge server 12 in Step S114, at which point the process returns to Step S111.

Figure 5B:
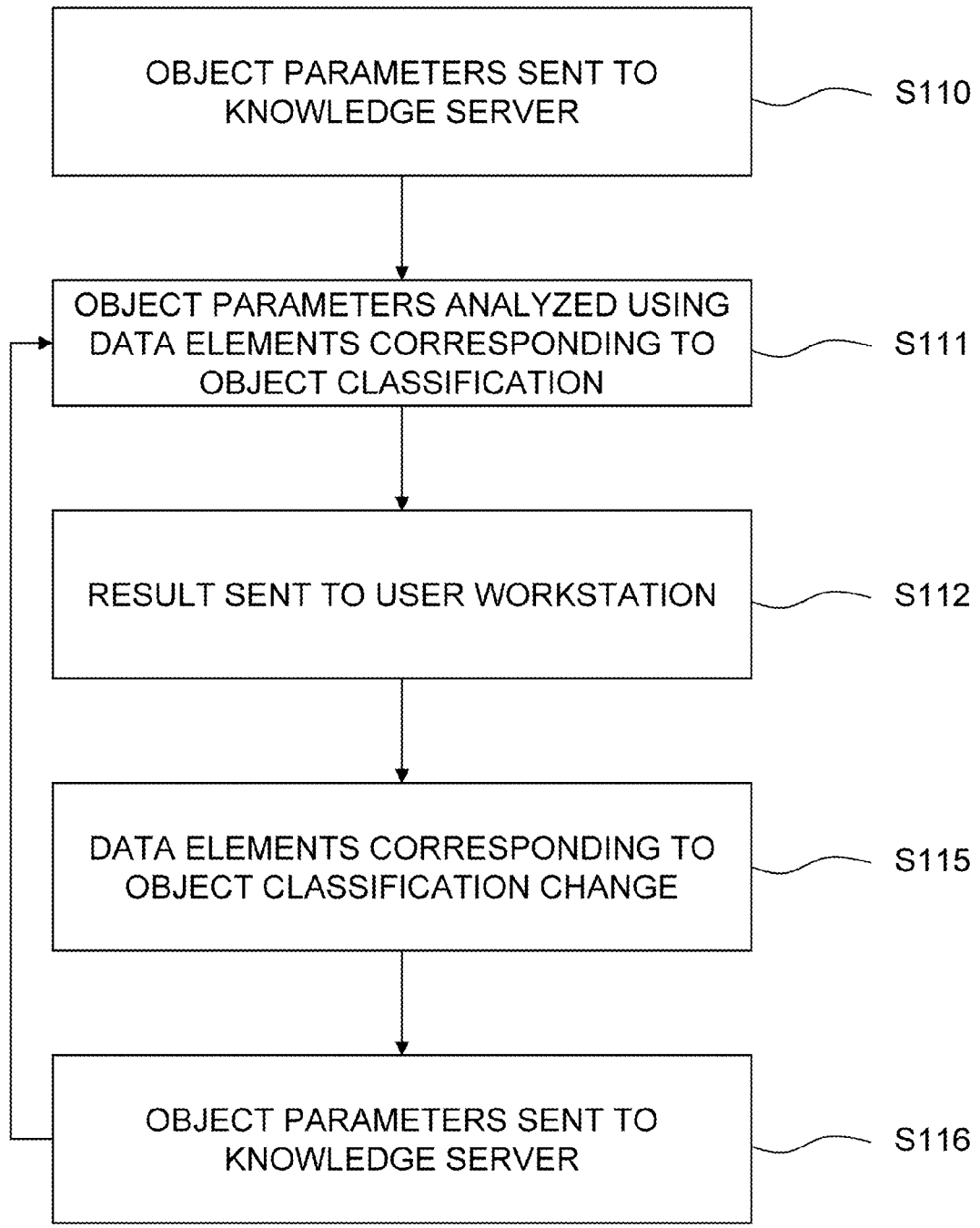
FIG. 5B is a flowchart explaining iterative operation of the knowledge management system in response to a change in the evaluation procedures used by the knowledge server.

Another example of iterative operation is shown in FIG. 5B, wherein Steps S110, S111, and S112 are as described in FIG. 5A. Subsequent to Step S112, the process proceeds to Step S115, wherein knowledge elements 20 corresponding to the object classification 30 change. This change could be either or all of a change in the definition of the object classification 30, a change to the substantive technical data encoded within a particular knowledge element 20, or expansion or contraction of the set of relevant knowledge elements 20 as a result of the object parameters 32. Step S115 represents the ability of the knowledge management system 10 to allow any of the object classifications 30 and their constituent knowledge elements 20 to be changed at any time, independent of the development of any particular object 26 at one of the user workstations 14. Step S115 represents the ability of the definition of the object classification 30 to be constrained or enlarged by the object parameters 32 themselves, in light of the associations between the knowledge elements 20 that are encoded within the knowledge elements 20. Thus, due to the distributed and dynamic nature of the knowledge management system 10, the change effected in the knowledge element 20 may be performed by another user in an asynchronous fashion with respect to development of the object 26 at the user workstation 14.

Subsequent to Step S115, when the object parameters 32 are next sent to the knowledge server 12 by the user workstation 14 in Step S116, the process proceeds to Step S111, where the object parameters are again analyzed in light of the knowledge elements 20 that correspond to the object classification 30. However, since the knowledge elements 20 have changed, the results provided by the knowledge server in the form of the required input parameters 34, the output parameters 36, and the status indication 38 may change with respect to those previously provided, regardless of whether the object parameters 32 provided by the user workstation 14 have changed. In this manner, the object 26 may be developed by the user using the application software 24 at the user workstation 14, but may be simultaneously evaluated in light of the knowledge elements 20 stored in the database 18 of the knowledge server 12, which may be updated by other users in an asynchronous fashion. Thus, the evaluations performed with respect to the object 26 are always made based on the most relevant, most recent information, without requiring any changes to the application software 24 or the application interface 28 of the user workstation 14.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. An interface method for a knowledge management system server, the method comprising:
   receiving a symbolic identification of an object classification from a first user system, the object classification describing an object on the first user system;
   retrieving a definition of the object classification from a database, the definition of the objection classification describing a collection of one or more data elements that have substantive technical data encoded therein;
   retrieving the data elements that are included within the definition of the object classification from the database, the data elements including one or more input parameters;
   transmitting an initial list of the input parameters to the first user system subsequent to the step of retrieving the data elements;
   receiving object parameters from the first user system subsequent to transmission of the initial list of input parameters, the object parameters further describing the object;
   transmitting an updated list of the input parameters in response to a change in the input parameters caused by at least one of a change to the definition of the object classification, a change to one or more of the data elements, or receipt of the object parameters from the first user system;
   identifying an evaluation procedure based on the object classification;
   determining whether the object parameters include all of a set of required input parameters for the evaluation procedure;
   performing the evaluation procedure using the object parameters if the object parameters include all of the required input parameters and transmitting a result to the first user system;
   adding the set of required input parameters for the evaluation procedure to the list of input parameters; and
   transmitting a status indicator to the first user system if the object parameters do not include all of the required input parameters, wherein the status indicator indicates that the evaluation procedure has not been completed.

2. An interface method for a knowledge management system server, the method comprising:
   receiving information from a first user system regarding an object, the information describing an object on the first user system;
   retrieving a definition of an object classification from a database based on the information;
   identifying an evaluation procedure based on the definition of the object classification, wherein evaluation procedure evaluates conformance of the object with respect to one or more design standards, wherein a set of required input parameters are associated with the evaluation procedure;
   transmitting a list of the required input parameters to the first user system;
   determining whether the information includes object parameters that correspond to all of the required input parameters for the evaluation procedure;
   performing the evaluation procedure using the information if the information includes object parameters correspond to all of the required input parameters, and transmitting a result to the first user system; and
   transmitting a status indicator to the first user system if the object parameters do not include all of the required input parameters, wherein the status indicator indicates that the evaluation procedure has not been completed.

3. The method of claim 2, further comprising:
   receiving updated object parameters from the first user system subsequent to the step of transmitting an updated list of the input parameters; and
   re-performing the evaluation procedure for the object upon receiving the updated object parameters from the first user system.

4. The method of claim 2, further comprising:
   transmitting an updated list of the required input parameters to the first user system in response to a change in the required input parameters.

5. The method of claim 4, wherein the change in the required input parameters is caused by instructions received from a second user system.

6. The method of claim 4, wherein the instructions received from the second user system modify at least one of the definition of the object classification or the evaluation procedure.

7. An interface method for a knowledge management system server, the method comprising:
   providing a database having a plurality of data elements stored therein, the data elements having substantive technical data encoded therein;
   receiving initial parameters from a first user system, the parameters describing an object on the first user system;
   querying a database using the initial parameters to identify one or more data elements that are related to the object based upon the initial parameters;
   retrieving the identified data elements from the database, wherein the data elements identify one or more required input parameters;
   transmitting an initial list of the required input parameters to the first user system;
   receiving instructions from a second user system subsequent to transmitting the initial list of the required input parameters to the first user system, wherein the instructions received from the second user system cause modification of at least one of the one or more data elements and change the one or more required input parameters identified by the one or more data elements; and
   transmitting an updated list of the input parameters to the first user system subsequent to receiving instructions from the second user system.

* * * * *